June 4, 1929.  D. ULREY ET AL  1,716,157
SPACE CURRENT DEVICE
Filed Sept. 28, 1923

WITNESSES:
R. J. Butler.
S. M. Pincles.

INVENTORS
Dayton Ulrey &
Christ Kirwer.
BY
Wesley G. Carr
ATTORNEY

Patented June 4, 1929.  1,716,157

UNITED STATES PATENT OFFICE.

DAYTON ULREY, OF WILKINSBURG, AND CHRIST KIRWER, OF EAST PITTSBURGH, PENNSYLVANIA, ASSIGNORS TO WESTINGHOUSE ELECTRIC & MANUFACTURING COMPANY, A CORPORATION OF PENNSYLVANIA.

SPACE-CURRENT DEVICE.

Application filed September 28, 1923. Serial No. 665,414.

Our invention relates to space-current devices and it has particular relation to gas-tight seals between the glass and metal elements utilized in such devices.

In making gas-tight seals between the glass and metallic tubes utilized in such devices, copper tubes for instance, the end of the metal tube is preferably formed into a knife-like end portion and the glass tube is welded preferably to the inner surface of the end portion. The vacuum-proof properties are obtained by reason of the fact that the thin, knife-like end portion of the metal is gradually stretched by the adhering glass wall and yields to the movement of the adjacent glass portions without breaking off or shearing therefrom.

One object of our invention is to provide glass-to-metal seals of the above-described character having a glass portion fused or welded over the joint between the glass and the metal.

Another object of our invention is to provide mercury arc devices utilizing improved glass-to-metal seals.

A further object of our invention is to provide a novel method of making improved seals of the above-described character.

In a co-pending application of D. Ulrey filed September 28, 1923, Serial No. 665,407 and assigned to the Westinghouse Electric and Manufacturing Company, is described a mercury arc rectifier employing tubular copper electrodes welded into a glass vessel. To protect the copper from the detrimental action of the mercury, the electrodes, after being welded to the glass, are coated with a substance such as iron or nickel which is not affected by the mercury.

It is sometimes difficult to provide a proper coating at the portion where the copper joins the glass, and consequently, this portion of the copper tube may be destroyed by the mercury. We have found that by welding a layer of glass over the joint to the adjacent glass and metal portions, subsequent to the coating with the metal, in such manner that the layer of glass overlaps the uncoated portion of the copper, the above difficulties may be avoided and the imperfectly coated portions of the metal electrodes adjacent to the glass-and-metal joints are fully protected.

Figure 1:
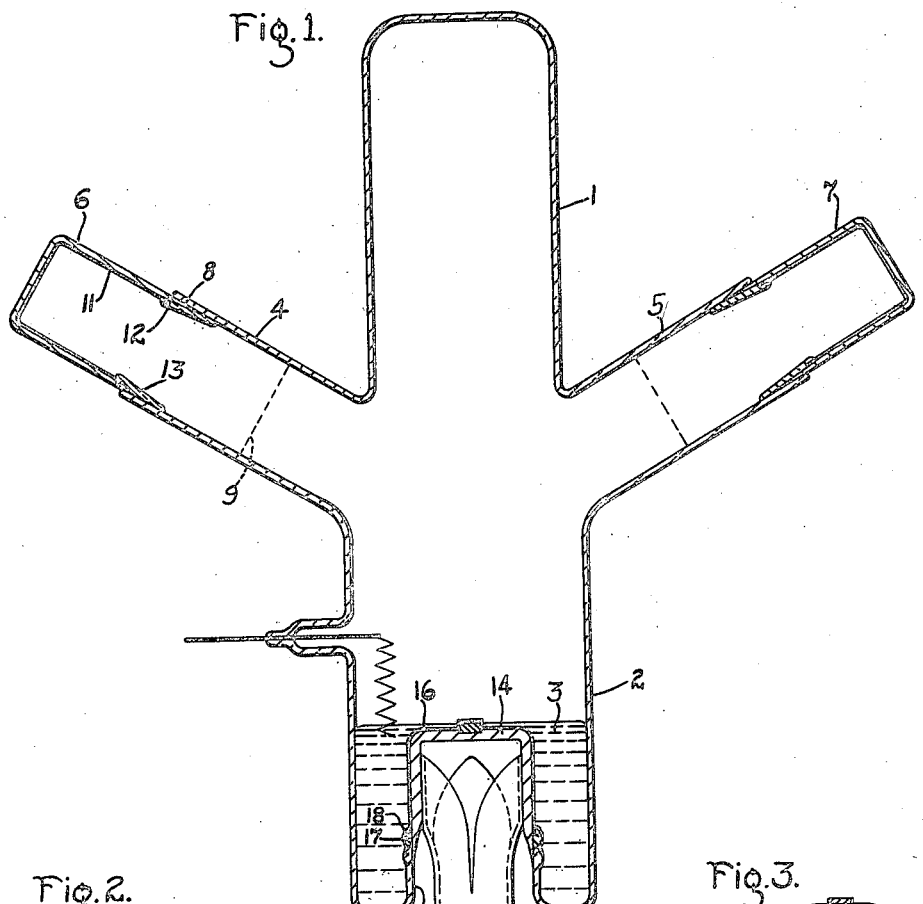
Figure 2:
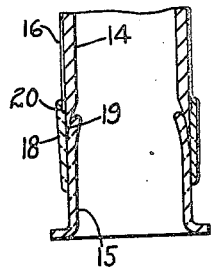
Figure 3:
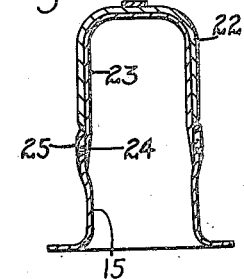

With the foregoing and other objects in view, our invention consists in the methods and details of construction described herein and illustrated in the accompanying drawing, wherein Figure 1 is a sectional view of a mercury arc rectifier utilizing our invention;

Fig. 2 is a similar view illustrating a portion of the rectifier adjacent to the metal-glass seal and showing a modification of our invention; and Fig. 3 is a view, similar to Fig. 2, illustrating another modification of our invention.

In Fig. 1 is shown a mercury arc rectifier comprising a glass vessel 1 having a depending portion 2 serving as a container for mercury 3 which is utilized as a cathode, and two side arms 4 and 5 having welded thereto two cup-shape electrode members 6 and 7 respectively, serving as anodes.

The cup-shape anodes 6 and 7 are preferably made from copper and have at their open ends, respectively, knife-like edge portions 8, to the outer surfaces of which the tubular glass arms 4 and 5 are respectively welded. In making such rectifiers, we first weld, a short length only of the tubular arm 4, as indicated by the dotted line 9, to the metal cap 6 and prepare the same in accordance with the methods described hereinafter, the perfected glass-metal member being thereupon fused to the main glass vessel of the rectifier.

In order to protect the copper of the anode cup 6 from the destructive action of the mercury within the rectifier, we coat the electrode surface which is exposed to the mercury with a mercury resistant coating 11, such for example, as iron.

It is often difficult to provide a sufficiently consistent coating 11 at the portion 8 of the metal cup adjacent to the joint of the glass and metal and we have indicated in the drawing that the protective coating 11 ends a short distance 12 before the knife-like end portion 8 begins. In order to protect the uncoated knife-like end portion 8 of the metal cup 6 and also in order to generally improve the gas-tight properties of the glass-to-metal seal, we weld a layer 13 of glass or other fusible material to the adjacent glass and metal portions of the glass to metal joint. The knife-like end portion 8 of the anode is thus embraced on both sides by glass walls and a joint is produced which is similar to that shown in the copending application of C. Kirwer, Serial No. 665,415, filed September 28, 1923, and assigned to the Westinghouse Electric and Manufacturing Company. The glass layer 13 overlaps the metal tube a distance which is sufficient to cover the uncoated or insufficiently coated portion of the copper electrode 6.

In making the overlapping layer or glass wall 13, we preferably use a glass which gives readily a good weld with the glass 4 of the side arm 4 of the container as well as with the iron coat 11. We have found that a sodium borosilicate glass is very well adapted for the above purpose.

For conveying the current to the mercury cathode 3 of the rectifier we provide a cup-shape electrode member 14 which is welded to a re-entrant portion 15 of the depending member 2 of the rectifier. The electrode member 14 may be made of copper and may have a mercury resistant coating 16 of nickel, for example, extending over the surface which is in contact with the mercury. To protect the portion of the electrode which is adjacent to the joint 17 between the glass and the metal electrode, a layer 18 of glass is welded over the joint and it overlaps the uncoated portion of the metal electrode, protecting the same.

Instead of using the glass-to-metal weld described in connection with the joint between the electrode 16 and the re-entrant member 15, we may equally well use the same joint as that described in connection with the anode 6 or vice versa. Such a weld is shown in Fig. 2 wherein the re-entrant portion 15 of the glass vessel is welded to the inner surface of the electrode member 14, the protective glass layer 18 being welded to the outer surface of the knife-like end portion overlapping on one side the knife-like edge 19, and on the other side the end portion 20 of the protective nickel coating 16 of the electrode member 14.

In Fig. 3 is shown a modification of our invention wherein we provide a sleeve 22 of mercury-resistant material, such as iron, and secure the same over the active portion of the copper electrode 23, the latter being welded to the glass member 15 in the manner described hereinbefore. The unprotected portion 24 of the copper electrode adjacent to the joint between the glass and metal may be protected by means of a glass layer 25 which is welded over that portion, overlapping the same on both sides thereof.

We do not desire to limit ourselves to the constructions and arrangements shown herewith but aim in the appended claims to cover all modifications that come within the scope of our invention.

We claim as our invention:

1. In a gaseous electric device, a glass member, a metallic electrode sealed to said glass member, a conductive coating covering the active portion of said electrode, and a protective coating of a material different from said conductive coating covering the joint between said glass member and said metallic electrode.

2. In a mercury-vapor device comprising a closed vessel, a tubular glass member, a tubular electrode welded to said glass member, the material of said electrode being affected by mercury but welding readily with glass, a conducting coating for protecting the exposed portions of said electrode, said coating extending near, but spaced from, the junction between said glass member and said electrode, and a layer of non-conducting fusible material welded over said junction and overlapping said coating.

3. In a mercury-vapor device comprising a closed vessel, a tubular glass member, a tubular electrode comprising a portion exposed to the mercury and an adjoining portion welded to said glass member, the latter portion being of a material which is detrimentally affected by mercury, and means for entirely covering said portion with a mercury-resistant material.

4. A gaseous-electric device comprising a gas-tight vessel having a metal wall portion and a glass wall portion joined to each other by a thin-edged gas-tight seal, said metal and glass being readily weldable to each other, said metal being detrimentally affected by gas present in the vessel, a thin metallic protective coating on the inner surface of said metal wall portion for protecting the same from the detrimental action of said gas while serving as the inwardly exposed surface of the metal wall portion, said metallic coating and glass being incapable of readily welding together, and a layer of a glass which is capable of making good welds with both said glass wall portion and said metallic coating welded over the junction of the same.

In testimony whereof, we have hereunto subscribed our names this 25th day of September, 1923.

DAYTON ULREY.
CHRIST KIRWER.